United States Patent [19]
Strickland et al.

[11] Patent Number: 5,984,503
[45] Date of Patent: *Nov. 16, 1999

[54] METHOD AND APPARATUS FOR ENTERING AND DISPLAYING STRUCTURE INFORMATION IN A MACHINING SYSTEM

[75] Inventors: Stephen Scott Strickland, Terrace Park; James R. Krietemeyer, Cincinnati; David M. Farmer, Loveland, all of Ohio

[73] Assignee: Vickers, Incorporated, Maumee, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/912,073

[22] Filed: Aug. 15, 1997

[51] Int. Cl.⁶ ..................................... G06F 19/00
[52] U.S. Cl. ................. 364/468.01; 364/474.23; 364/138; 318/569
[58] Field of Search .................. 364/468.01, 474.22, 364/138; 318/569

[56] References Cited

U.S. PATENT DOCUMENTS

| | | | |
|---|---|---|---|
| 5,122,717 | 6/1992 | Hayashi | 318/569 |
| 5,243,665 | 9/1993 | Maney et al. | 382/152 |
| 5,266,876 | 11/1993 | Ito et al. | 318/568.24 |
| 5,321,800 | 6/1994 | Lesser | 345/440 |
| 5,465,215 | 11/1995 | Strickland et al. | 364/474.22 |

OTHER PUBLICATIONS

Vickers Electronic System Division, *Operation Guide for Vickers Acramatic A2100 CNC MC Control*, Publication No. 7–000–5188PG, Date of Issue Apr. 1996, Release 2, pp. 17–43.

*Primary Examiner*—William Grant
*Assistant Examiner*—McDieunel Marc
*Attorney, Agent, or Firm*—Dinsmore & Shohl LLP

[57] ABSTRACT

A method and apparatus for displaying and entering information associated with structures in a machining system, wherein each structure is associated with at least one setup in the machining system, and can be, for example, a pallet, fixture, or workface. A user interface receives the structure information from the user and displays at least a portion of the information, along with a structure icon, within a window on a display device. Preferably, the location of the tool in the machining system is also displayed within the window along with a machine configuration image which represents the configuration of the machining system. The structure information preferably includes the offset coordinates for the structure. Upon request from the user, setup icons and setup information for the setups associated with the structure can be displayed.

28 Claims, 11 Drawing Sheets

METHOD AND APPARATUS FOR ENTERING AND DISPLAYING STRUCTURE INFORMATION IN A MACHINING SYSTEM

TECHNICAL FIELD

This invention relates to a system and method for entering and displaying information associated with structures in a machining system, and, more particularly, to a system and method for entering and displaying information associated with structures such as pallets, fixtures, and workfaces in a machining system.

BACKGROUND OF THE INVENTION

Power machining systems typically include a hydrostatically supported spindle, a tool holder located in the spindle socket, a machine tool secured in the tool holder, and a control system connected to the spindle for controlling the various machining operations of the tool, such as boring, drilling, or cutting various shapes and/or patterns in a workpiece or part, such as a piece of metal. Single or multi-point cutting tools including broaching tools, milling cutters, honing stones, and saw blades, are common forms of the tools utilized in machining systems. Some of these tools remove material from the part in large chips or pieces, while others such as a saw blade remove stock by cutting away small particles. Machining operations commonly performed by such machines include boring, milling, sawing, shaping, planing, drilling, buffing, and polishing. Often such machines have advanced features such as coolant delivery systems and rapid tool changing capability.

The control system furnishes the power for the machining operation, and also determines the manner in which the operation is carried out. Typically, a computer numerical control (CNC) serves as the control system for the machining system, in which case the machining system is referred to as a CNC machine. An example of a computer numerical control is the A2100 manufactured by Vickers, Incorporated, a preferred configuration of which is disclosed in U.S. Pat. No. 5,465,215. As disclosed in the '215 patent, a computer numerical control such as the A2100 typically includes a work station processor such as a personal computer processor, which is connected to an operator station that includes a display device and a means for providing input to the work station processor. The work station processor and the operator station allow for the operator of the control system to select the operation to be performed on various parts and enter associated data.

In power machining operations, relative movement is provided between a cutting tool and the part. The cutting tool also generally uses either a rotating or a traversing motion with respect to the part to perform the machining operation. It is common for the part to remain secured to a fixed structure, such as a work table, through the use of an attachment mechanism, such as a bolt, clamp, or vise, while the tool is moved about the part. In order for the system to know where the part and attachment means are located with respect to a pre-determined location within the system, offset coordinates are provided to the machine. The part itself, the means used to secure the part, and the offset data are collectively known as a "setup." If the same machining operation is to be applied to a number of parts each of which has its own attachment device, the attachment device is referred to as a "fixture" and its offset coordinates are referred to as a fixture offsets. The fixtures on which the operation is to be performed are collectively referred to as a "setup".

In the past, after machining the setups, the operator was forced to stop the machine, remove each part from its respective attachment device, attach additional parts to be machined to the work table, and enter offset data associated with each of the new parts. To reduce the inefficiencies associated with this process, it became common to secure parts to be machined onto a movable tray, or pallet. Thus, while the machining system was operating on one group of setups located on a pallet, the operator could secure additional parts to a separate pallet. When the machining operations were completed on the first pallet, the operator, through the use of a crane or robot, could remove the first pallet from the machining area and insert the second pallet upon which setups had already been arranged.

In order to reduce the number of times that pallets had to be switched, tombstones (for mounting on pallets) and rotary table fixtures (for mounting on rotary tables) were developed. Both tombstones and rotary tables fixtures are multi-sided structures, wherein each of the sides, or workfaces, can be used to secure at least one setup, each of the setups including at least one part to be machined. Typically, a tombstone or rotary table fixture is a block of metal having a top surface, a bottom surface, four side surfaces, and a plurality of apertures for use in securing parts. A tombstone is rotatable about a vertical axis and, accordingly, is used with "horizontal" machines, i.e., machines whose spindle and tool are located on a horizontal axis. In contrast, rotary table fixtures are rotatable about a horizontal axis and are used with a "vertical" machine, a machine having a spindle and tool located on a vertical axis. After the machining system has machined all of the setups located on a particular workface, the tombstone or rotary table fixture can be rotated such that the setups located on the next workface may be machined. Once all of the parts on a tombstone or rotary table fixture have been machined, the tombstone or rotary table fixture can be removed from the machine and another tombstone or rotary table fixture can be inserted. Accordingly, the use of tombstones and rotary table fixtures allows for the efficient machining of numerous parts.

The machining system must be provided with certain data, such as the location of the part in relation to a fixed point in the system (this location often is referred to as the "offset" of the part) and the machining order of the setups and pallets. To properly determine this point for each part, the machine must know the offset coordinates for the pallet upon which setups are located, the offset coordinates for each setup, and the offset coordinates for each fixture that makes up a particular setup. In the past, these offset coordinates and other data were entered into a large, cumbersome data table that was similar to a spreadsheet. This data table was difficult to read and manipulate and, thus, the operator could easily make errors when providing data to the table.

To overcome such problems, a software program has been developed that provides a more efficient, user-friendly way to enter and view offset coordinates and other data associated with setups and machining operations. This program can be executed through use of the work station processor and operator station of a control system, such as a CNC, and is marketed by Vickers Inc. under the name Multiple Setup Support Application Release 2.0. The program provides a user interface that allows for the operator of the control system to efficiently enter setup data into the data table so that the control system can properly machine the part. This data includes information regarding where the setup is located (i.e., setup offset coordinates), and the order in which the setups are to be machined (i.e., execution order). The program also visually displays such setup information, as well as setup icons in an arrangement that mimics the actual location of the setups located on a pallet or work table in the machining area. In addition, the program can display information provided by the machine control system, such as the location of the machine tool, the status of each setup, and the total number of setups that have been completed or have been aborted.

While the Multiple Setup program is an effective and advantageous means of viewing and entering information associated with setups, it is not without disadvantages. Most notably, the program does not allow for the viewing or entry of data or information associated with the various structures to which a particular setup is related. For example, the program has no means for allowing the operator to enter and view information regarding the various pallets or workfaces upon which setups are located. Moreover, the program has no means for viewing or entering information relating to the various fixtures that can make up a particular setup. Consequently, when this program is used, information regarding these structures has to be entered and viewed using the data table, a process which is prone to operator error due to the difficulty of viewing and locating data within the table.

Moreover, because the program has no means for dealing with structure information, status information regarding these structures is output directly to the large data table and is not readily available for the user through the program. Thus, if the operator wants the system to automatically machine a plurality of pallets while the operator is absent, the operator has to scrutinize the large data table upon his return to determine whether an error occurred on a pallet and with which setup the error occurred. The program has no means of indicating which pallets had been machined and the status of each pallet.

In addition to having no capabilities relating to pallets, workfaces, and fixtures, the Multiple Setup program has no way of keeping track of the setups outside of the machining area. Consequently, when using this program, the operator has to enter data regarding the setups that are on pallets outside of the machining area directly into the data table. Thus, the program has no means of quickly and easily entering data associated with setups outside of the machining error, nor of displaying the status of these setups.

Accordingly, there has been a continuing need for a means for efficiently keeping track of the various structures (i.e., pallets, fixtures, and workfaces) associated with setups as well as to easily enter data regarding these structures. Moreover, there has been a need to provide a means for easily and efficiently displaying and entering information regarding setups that are located outside of the machining area.

SUMMARY OF THE INVENTION

It is an object of this invention to obviate the above-described problems.

It is another object of the present invention to provide a method, system, and user interface for entering and displaying information associated with a structure, such as a pallet, fixture, or workface, that is associated with at least one setup in a machining system, such that the operator of the system can easily and efficiently enter and access the information associated with such structures.

It is yet another object of the present invention to provide a method, system, and user interface that allow for the relatively simple and efficient entry of information associated with setups located outside of the machining area, and for the display of information associated with these setups.

Another object of the present invention is to provide a system, user interface, and computer implemented method which allow for the display of graphical representations of structures with which a setup may be associated, such as in the form of icons, according to the physical location of the structure in relation to the machining system.

A further object of the present invention is to provide a system, user interface, and computer implemented method that allows for the display of an image, such as a bitmap, that represents the configuration of the machining system, and that also allows for the display of pallet icons in coordination with the display of the bitmap, such that the actual physical location of pallets in relation to the machining system is represented.

A further object of the present invention is to provide a system, user interface, and computer implemented method that allow the operator of a machining system to view information relating to setups, and the structures associated with the setups, in hierarchical succession, such as by viewing information relating to a pallet and subsequently viewing information relating to the setups located on the pallet.

It is yet another object of the present invention to allow an operator to quickly and efficiently view the status of a plurality of pallets which have been machined by a machining system, as well as the status of the setups on those pallets.

In accordance with one aspect of the present invention, a computer-implemented method is provided for displaying a graphical representation of a structure in a machining system and information associated with the structure. The structure is associated with at least one setup in a machining system, and the machining system is operative for machining at least one part associated with the at least one setup. The method comprises obtaining structure information associated with the structure, displaying at least a portion of the structure information, associating at least a portion of the structure information with an icon location, and displaying a structure icon at the icon location. The icon location corresponds to a position on the display device, and the structure icon represents the structure. In accordance with another aspect of the invention, a computer readable medium is also provided which has this method encoded thereon.

In another aspect of the invention, a system for entering and displaying information associated with a structure in a machining system is provided. The system comprises a data structure containing structure information, and a display including a structure icon and at least a portion of the structure information. The structure information is associated with a structure which is associated with at least one setup in a machining system. The machining system is operative for machining at least one workpiece associated with the at least one setup. The structure icon represents the structure. The display is adapted to receive inputs for modifiing the data structure.

Yet another aspect of the invention is a user interface for entering and displaying information associated with a structure in a machining system. The user interface comprises a structure icon, and structure information. The structure icon represents a structure which is associated with at least one setup in a machining system. The machining system is operative for machining at least one workpiece associated with the at least one setup. The structure information is associated with the structure.

In accordance with a further aspect of the invention, a computer-implemented method is provided, comprising the steps of displaying a plurality of pallet icons, obtaining a plurality of pallet data records, and displaying at least a portion of each pallet data record in proximity to each displayed pallet icon such that the pallet icon is shown to correspond to the pallet record. Each pallet icon represents a pallet in a machining system and each pallet data record is associated with a pallet. Preferably, the method also comprises the steps of selecting one of the pallet icons with a selection device, and, after selecting the pallet icon, displaying setup data associated with the selected pallet icon. Even more preferably, the method comprises displaying a plurality of setup icons, selecting one of the setup icons with a selection device, and, after selecting the setup icon, displaying fixture data associated with the selected setup icon. Each portion of the fixture data is associated with a fixture in the machining system.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE PREFERRED EMBODIMENTS

Figure 1:
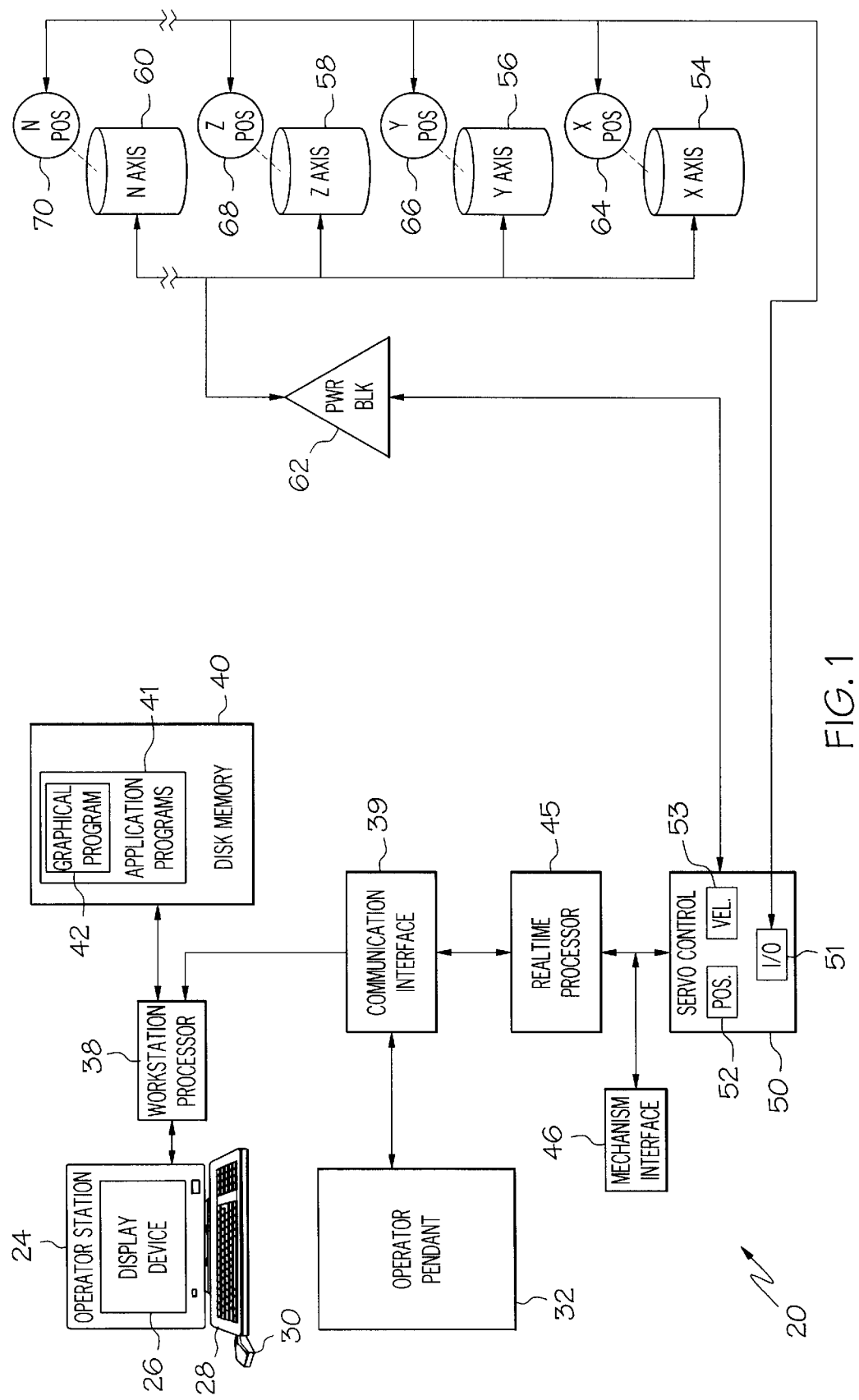
FIG. 1 is a block diagram of a control system utilizing an embodiment of the present invention.

Referring now to the drawings in detail, wherein like numerals indicate the same elements throughout the views, FIG. 1 schematically illustrates a preferred application for the present invention. The invention preferably is utilized in a computer numerical control (CNC) 20, such as the A2100, which is described in U.S. Pat. No. 5,465,215, the entire disclosure of which is hereby incorporated herein by reference. The CNC 20 preferably includes an operator station 24, an operator pendant 32, a workstation processor 38, a real time processor 45, a mechanism interface 46, and a servo control 50. The CNC 20 controls machine mechanisms, including servo controlled actuators, such as the motors 54, 56, 58, and 60, in response to inputs by the user. The machine mechanisms are connected to a machine tool and control the operation of the tool.

Operation of the CNC 20 is preferably controlled by software programs, the execution of which is achieved by operating system environment programs. Such software programs are known as "application programs" and control how various aspects of the CNC 20 function, including, for example, functions of the work station processor 38 and the real time processor 45. One such application program is a mechanism control program which controls the functioning of the machine mechanisms, such as the motors 54, 56, 58, and 60.

The operator pendant 32 displays the current location of the machine, or machine member coordinates, as well as the current machining operation being performed and the machine status. The pendant 32 also permits an operator to manually direct movement of the servo controlled motors 54, 56, 58, and 60 and to initiate execution of program controlled machining operations.

The work station processor 38 preferably includes a microprocessor and random access memory. The microprocessor is preferably an INTEL PENTIUM class processor, but other commercially-available processors may also be used. Workstation processor 38 also preferably includes a disk controller for controlling the transfer of programs and data to and from the disk memory 40, a display controller to control the data and images displayed on the display device 26, and an input interface to detect and decode outputs from the keyboard 28, the trackball 30, and a touch screen fitted on display device 26.

The functioning of the workstation processor 38 is controlled by software programs stored in the disk memory 40. Also stored in the disk memory 40 is the operating system for the workstation, which will preferably provide a multi-tasking environment for execution of the application programs. Preferably the MICROSOFT WINDOWS NT operating system is utilized.

The workstation application programs 41 can include manual data input programs which allow for graphically assisted data input, application management control programs which control selection of operating modes of the CNC 20, and automatic numerical control (N/C) programs which control workstation operation in connection with the automatic execution of stored user programs.

The present invention relates to a program 42 that provides graphical assistance in viewing and entering information relating to various structures in a machining system. The program 42 is a type of workstation application program 41 that graphically assists the user in viewing and entering information associated with setups to be machined, as well as to display and enter information associated with structures, such as pallets, fixtures, and workfaces. The program 42 also allows the user to monitor, on the display device 26, the status of the machining operations performed by the tools connected to the machining mechanisms 54, 56, 58, and 60, to input setup and structure data using the keyboard 28, the trackball 30 and/or a touch screen fitted on display device 26, and to control machining operations via inputs from these input devices. A mouse or other similar input device may also be used to supply these inputs.

The real time processor 45 can comprise a personal computer microprocessor and random access memory. Real time operating system programs and real time application programs can be used to control execution of the real time processor 45 and can be stored in the disk memory 40. Real time application programs can include access management routines, programmable logic controller routines, program translator routines, manual routines, and path generator routines as are known in the art and as are disclosed in U.S. Pat. No. 5,465,215.

A mechanism input and output interface 46 provide interface circuits between machine mechanisms, such as mechanical push buttons, lights, solenoids, relays and limit switches, and logic circuitry of the CNC 20. Such machine mechanisms produce input and output signals that can be controlled by programmable logic controller routines located in the disk memory 40. Techniques for providing such program control of machine mechanisms and for implementing program controlled execution of such mechanism control programs are well known in the art.

A communication interface 39 allows for data communication between workstation processor 38 and real time processor 45. The communication interface 39 also allows for the transfer of real time application programs from disk memory 40 to RAM of real time processor 45, as well as permitting the exchange of data and control systems with the operator pendant 32.

The servo control 50 responds to position commands and feed forward commands to effect servo control of actuators, such as the motors 54, 56, 58 and 60, which are used to move and control the machine tool. Each servo controlled motor has an associated position transducer, such as transducers 64, 66, 68, and 70, which are connected to the CNC 20 via transducer input/output interface circuitry 51 located in the servo control 50. The servo control 50 also includes a position loop controller 52 which compares input position commands with measured position determined from the position transducers to generate velocity commands. A velocity loop controller 53 responds to velocity commands and velocity feed forward commands to produce actuator control signals. The actuator control signals are used to control power delivered to the actuators through power control devices, such as transistors, located at power block 62.

In operation, the user can utilize workstation application programs located in disk memory 40 to control machining operations, such as drilling and milling. The user may utilize a manual data input program which displays various machining commands as images on display device 26 and allows the user to select the desired command using keyboard 28, trackball 30, or a touch screen input device fitted onto the display device 26. When the user enters program codes and numeric data to define a desired machining cycle, program translator routines located in disk memory 40 control the retrieval and execution of the instructions corresponding to the codes and data provided by the user. These program translator routines may be used in combination with programmable logic controller routines, also located in disk memory 40, to control machining functions, as well as machine position.

While the present invention is preferably utilized in a computer numerical control system, such as shown in FIG. 1, in the form of a software program 42 located in disk memory 40, it is to be understood that the invention can be embodied in other forms and be utiled in other applications as well. In addition, the invention may be utilized with a variety of machining systems, including those that operate horizontally, those that operate vertically, and those that utilize standard worktables instead of pallets or rotary tables. Moreover, the invention may exist separately and independently from the machine control system that controls the machining system. Machining systems, as used herein, refers to wide variety of machines, machine tools, machining centers, turning centers, and/or combinations thereof.

Moreover, the method according to this invention can be embodied as an article of manufacture by configuring the method as a program on a computer readable medium, such as a floppy disk, CD-ROM or other persistent storage medium. According to another embodiment of this invention, the invention is embodied as a special purpose apparatus having executable instructions suitable for carrying out the invention stored in a RAM or ROM, or a combination of both. The method can be implemented in any conventional programming language, such as, for example, C, C++, Visual Basic, or JAVA, or can be implemented in a special purpose programming language. Preferably, the program is implemented in Visual Basic programming language.

Figure 2:
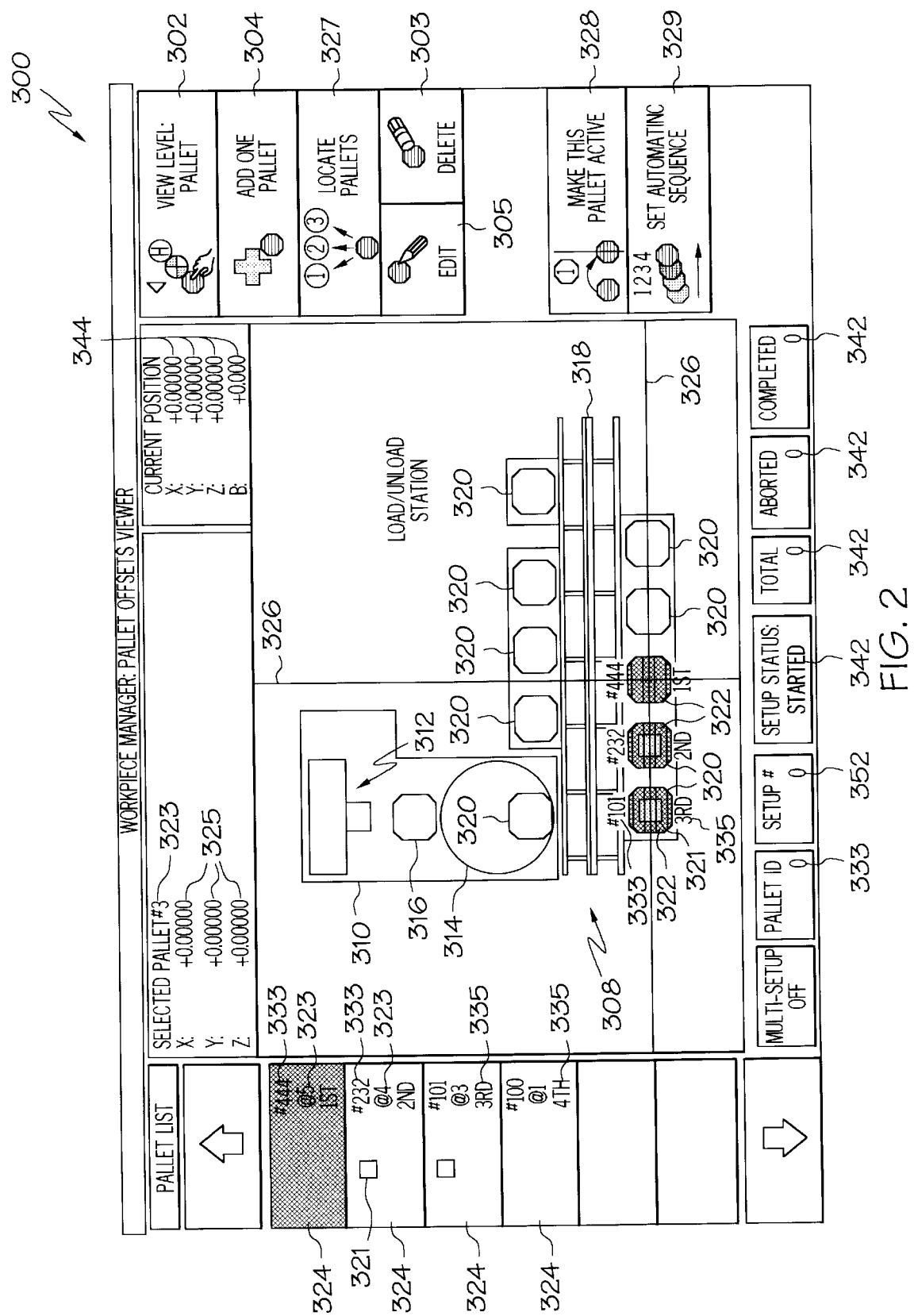
FIG. 2 is a schematic view of computer-implemented pallet view display according to one embodiment of the present invention.

FIG. 2 illustrates a preferred user interface for use in viewing and entering information regarding pallets in a machine tool system. Upon initiation, program 42 (FIG. 1) displays window 300 on the display device 26 (FIG. 1), which includes a variety of information, buttons, icons, and menus. Alternatively, the entire screen of the display device may be used as a window for viewing the information, icons, buttons, and menus displayed by the program.

The "view level" button 302 can be selected to toggle between pallet view, setup view and fixture view, thereby allowing the user to view information associated with setups in a machining system, or information associated with structures in the system, such as pallets and fixtures. If the user selects pallet view, the program 42 (FIG. 1) obtains information relating to pallets that are located either in the machining area or in the proximity of the machining system. As noted above, such pallets are utilized by the operator of the machining system to efficiently machine parts secured to the pallets. To add information regarding pallets, the operator may select the "add one pallet" button 304.

Figure 3:
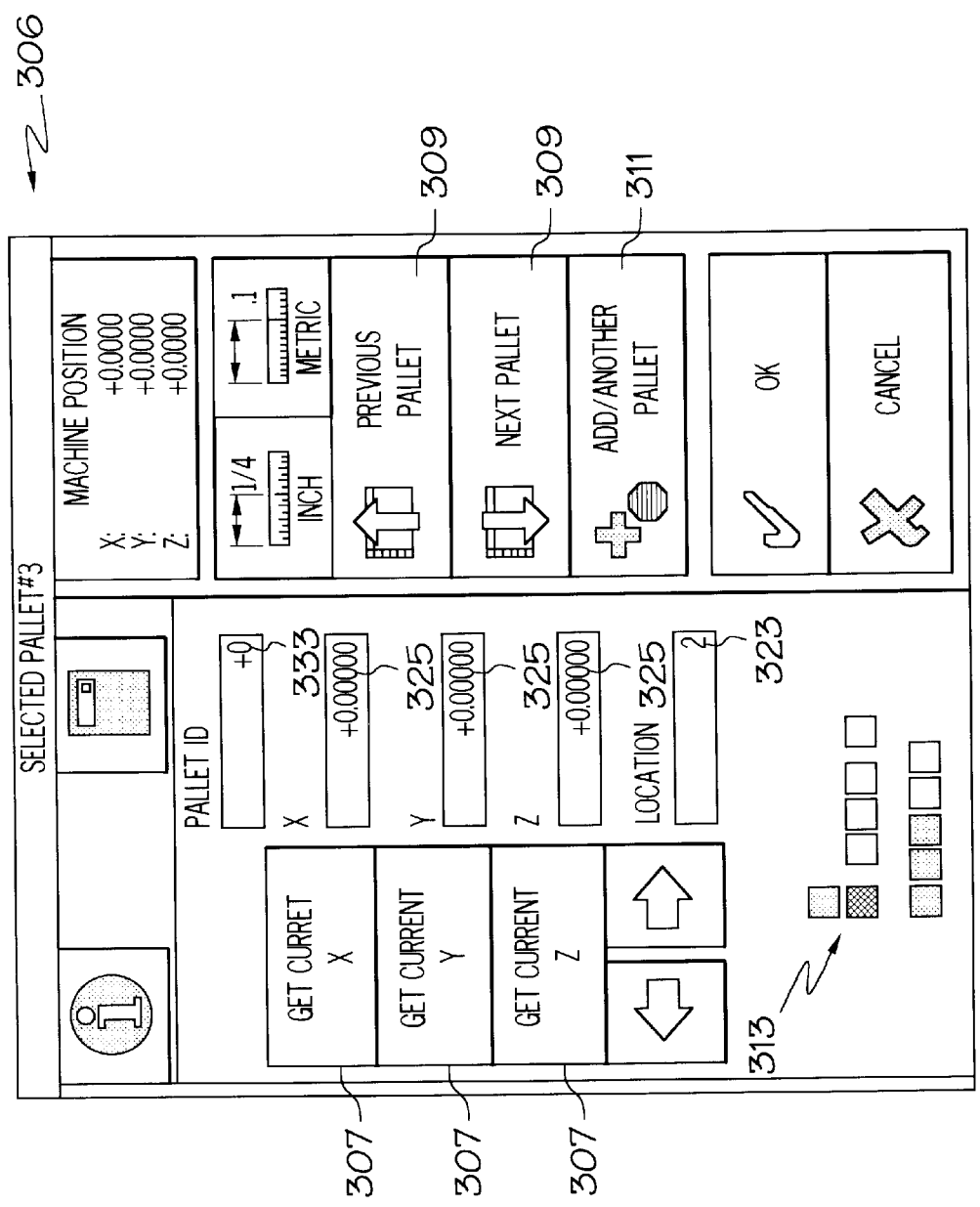
FIG. 3 is a schematic view of a preferred computer-implemented display for the entry of information associated with the pallets in a machining system.

Upon activation of button 304, an "add pallet dialogue box" 306, as illustrated in FIG. 3, is displayed. The dialog box 306 allows the user to enter information associated with a pallet to be machined by the machining system. This pallet information can include a pallet ID number 333, pallet offset coordinates 325, and a pallet location number 323. The pallet ID number 333 is assigned by the operator and, preferably, corresponds with the pallet number located on the pallet itself. The pallet location 323 number is assigned by the user according to the position of the pallet in the machining system. Typically, the machining system allows for pallets to be placed at certain defined locations. The pallet offset coordinates 325 preferably comprise an "x" coordinate, a "y" coordinate and a "z" coordinate, the coordinates corresponding to the position at which the pallet (or tombstone on the pallet) will be placed relative to a predetermined fixed position in the machining system when the pallet is in the machining area. The machine uses these coordinates 325, along with the offset coordinates for the setup and fixture, to find the correct location of a part located on the pallet during machining operations.

The dialog box 306 also allows the user to view and edit information for pallets already defined by pressing the "previous" or "next" buttons 309. Moreover, an additional pallet may be defined by pressing the "add another pallet" button 311. Through map 313, the dialog box 306 also indicates which pallet park stations are currently empty.

Referring again to FIG. 2, machine configuration image 308 illustrates a possible configuration for a machining system. The machine configuration image 308 is created by the user upon initial configuration of the program and is created according to the configuration of the particular machining system utilized by the user. Program 42 (FIG. 1) may contain a separate configuration routine which allows this configuration to be achieved. However, it is preferred that a separate configuration program is provided as one of the application programs 41. Preferably, the machine configuration image 308 is drawn using a graphics program or CAD program, and is stored in a graphics format directly supported by WINDOWS, such as in a .PCX, .DXF, or .BMP format. In the particular configuration of the image 308 of FIG. 2, the machining system is represented by 310, and comprises a spindle and spindle carrier 312, a turntable 314 used to rotate pallets to the machining position, and a machining area 316. A rail guided vehicle system 318 is also represented. This system is used to move pallets to and from the pallet turntable 314. Typically, a robot or crane is used to perform such movement of the pallets. The various locations at which pallets may be placed prior to being machined, also known as pallet park stations 320, are also represented by the image 308. It is preferred that the program includes a number of pre-drawn images which correspond to standard machine configurations, giving the user the option to display the image which corresponds to the user's machine.

In the pallet dialog box 306 of FIG. 3, the user can enter a pallet location number 323 that corresponds with the number of the pallet park station 320 at which the pallet is located. The program matches the pallet location number 323 to one of the pallet park station numbers defined by the user at initial configuration, and displays a pallet icon in window 300 of FIG. 2 at the pallet park station 320 to which the pallet location number corresponds. Thus, the program associates the pallet location number 323, entered by the user, with an icon location and displays a pallet icon at that location. Icon, as used herein, means any graphical representation of a structure, object, or function, and can be, for example, a word, symbol, shape, or combination thereof. It is preferred that the icon used to represent a pallet is an octagonally shaped pallet icon 322, such as to fill in the appropriate park station 320, as illustrated in FIG. 2.

The position at which a pallet icon 322 is displayed is preferably defined by the user at the initial setup of the workstation program. After the user has created a machine configuration image corresponding to the user's machine configuration (using the configuration routine or program), the user can select icon locations within window 300 where the user wishes pallet icons to be displayed. Preferably, the user assigns a number to each of the pallet park stations 320 and enters this number into a database by using the program 42. Upon assigning and entering a number for a particular pallet park station 320, the user can select the middle of the pallet park station 320 using a selection device, such as a trackball. The program then saves the pallet park station number, as well as the location selected. Then, when the user enters a pallet location, such as by using dialog box 306 of FIG. 3, the program matches the pallet location entered with a pallet park station number, and displays a pallet icon, such as pallet icon 322, at the icon location selected by the user for that park station number during the initial configuration. Thus, machine configuration image 308 indicates the actual configuration of the particular machining system utilized by the user, and pallet icons 322 are overlayed on the image in order to indicate at which pallet park stations pallets are actually located.

After pallet information has been entered, the user may instruct the program to save the information, preferably by clicking on an OK button. This saves the information for the pallet in a computer readable memory, preferably in the form of a data record located within a data structure. Once the pallet information is entered and saved, a pallet icon and the pallet information for the pallet are displayed on the display device. This display preferably looks like the window 300 shown in FIG. 2, wherein the image 308 indicating the configuration of the machine is displayed, as well as pallet icons 322 at appropriate pallet park station locations 320. It is also preferred that the pallet ID 333 is displayed above the pallet icon 322, and the order 335 that the pallet will be executed is displayed below the pallet icon. Even more preferably, a pallet list is displayed down the left side of the window. The pallet list comprises a series of buttons 324, each button having pallet information for a single pallet displayed thereon. If the user wishes to view additional pallet information about a pallet, such as the information regarding setups located on a pallet, the user may select with a selection device, either a pallet button 324, or pallet icon 322, corresponding to the pallet in which the user is interested. Upon selection of a pallet, it is preferred that cross hairs 326 are displayed on the pallet selected. Once a pallet is selected, additional pallet information can be displayed on the display device, such as offset coordinates 325 for the pallet. The user may then change the view level using "view level" button 302 to display information regarding fixtures and/or setups on the selected pallet.

Alternatively, the user may edit or delete the information entered for the selected pallet by using "edit" button 305 or "delete" button 303, respectively. The selection of the "edit" button 305 preferably displays a pallet dialog box, such as the dialog box 306 illustrated in FIG. 3, which allows information entered for the selected pallet to be edited. This dialog box 306 may also be utilized to obtain more precise offset coordinates for the pallet than were originally entered. Typically, if pallet information is being added and the pallet is outside of the machining area, the offset coordinates 325 for the pallet (or tombstone on the pallet) will be estimated by the user, through the use of a measuring device such as a tape measure. However, once the pallet is in the machining area, the user may utilize the edge finder functions of the machining system to obtain precise pallet offset coordinates. To do so, the user positions the machine at the X, Y, or Z location of the pallet and then presses one of the buttons 307 to get the precise coordinate corresponding to that position. A probe could also be used to determine the precise offset coordinates. Thus, "rough" offset coordinates 325 for a pallet can be entered even when the pallet is outside of the machining area, while precise offset coordinates 325 for the pallet may be obtained when the pallet is in the machining area.

Preferably, display window 300 of FIG. 2 also has buttons 327, 328, and 329. The "locate pallet" 327 displays a dialog box which allows the user to quickly change the location information for each pallet. The "activate pallet" button 328 displays a dialog box which causes the selected pallet to be loaded into the machining area. The actual instructions necessary for loading the pallet are provided by a machine application interface program. The "automatic sequence" button 329 displays a dialog box which allows the user to indicate in which order the pallets are to be machined.

It is also preferred that a status indication symbol 321 is displayed over or near each pallet button 324 and pallet icon 322. The status indication symbol 321 indicates the status of the pallet represented by the button 324 or icon 322. This symbol 321 can indicate whether the pallet is ready for execution, has been executed, or has been aborted. Thus, the operator of the program can leave the machining system and, upon return to the system, quickly determine which pallets have been aborted due to execution error. Preferably, the color of the symbol 321 indicates the status of the pallet.

Figure 4:
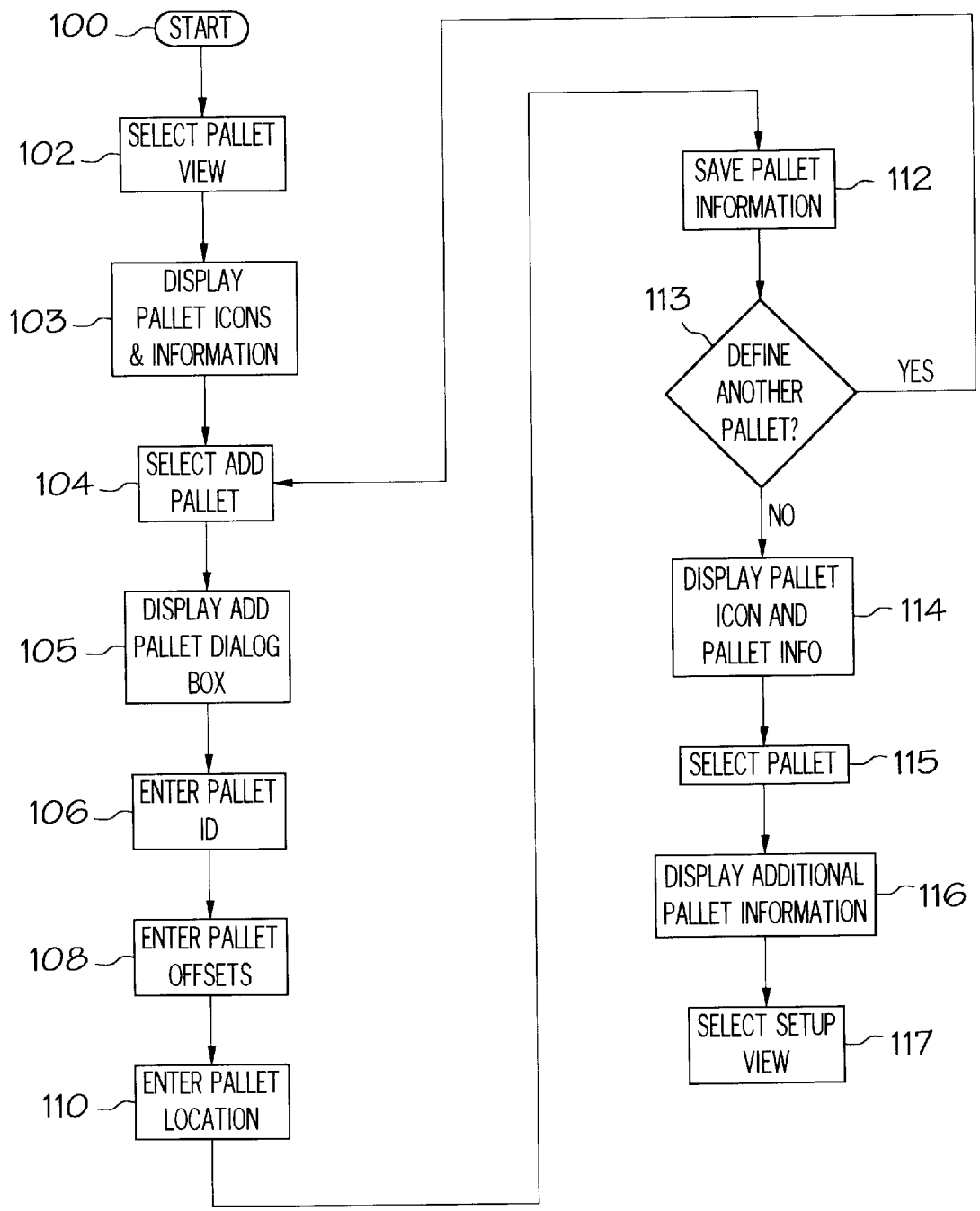
FIG. 4 is a flow diagram illustrating a preferred method for entering and viewing pallet information, according to one embodiment of the present invention.

FIG. 4 is a flow diagram illustrating a preferred method for displaying and entering information regarding pallets in a machining system, such as by using the window of FIG. 2 and dialog box of FIG. 3. At block 100, the program is initiated, preferably by pressing a button on a button bar through the use of a touch screen input device located on the display device. If the pallet view has not yet been selected, the user selects the pallet view at step 102 of FIG. 4. The selection of the pallet view causes pallet information and pallet icons to be displayed on the display device at step 103, if pallet information has already been entered by the user. Preferably, an image is also displayed at step 103 representing the configuration of the machining system. If additional pallet information is to be entered or if no pallet information has yet been entered, the user chooses to add pallet information at step 104. When the select add pallet step 104 is initiated, the user can enter pallet information, preferably through the use of an add pallet dialog box which is displayed at step 105 and which preferably takes the form of the dialog box 306 of FIG. 3. Through the dialog box, the user can enter pallet information, such as a pallet ID, pallet offset coordinates, and a pallet location number, as indicated at blocks 106, 108, and 110 of FIG. 4.

Once all of the pallet information has been entered, the information is saved at step 112, preferably when the user selects an OK button or presses an Enter key. When the pallet information has been saved, the user can choose to define additional pallets at step 113. If the user chooses to define additional pallets, steps 104–112 are repeated. If the user chooses not to define additional pallets, step 114 is executed wherein pallet icons and pallet information are displayed for the defined pallets. At step 115, the user can then select a pallet in which the user is interested in viewing additional information, such as by selecting a button 324 or pallet icon 322 of FIG. 2. Upon the selection of the pallet, additional pallet information is displayed at step 116, such as pallet offset coordinates 325 of FIG. 2. After a pallet has been selected, the user may then choose to select the setup view at step 117, so that the setups associated with the selected pallet may be viewed and edited.

Figure 5:
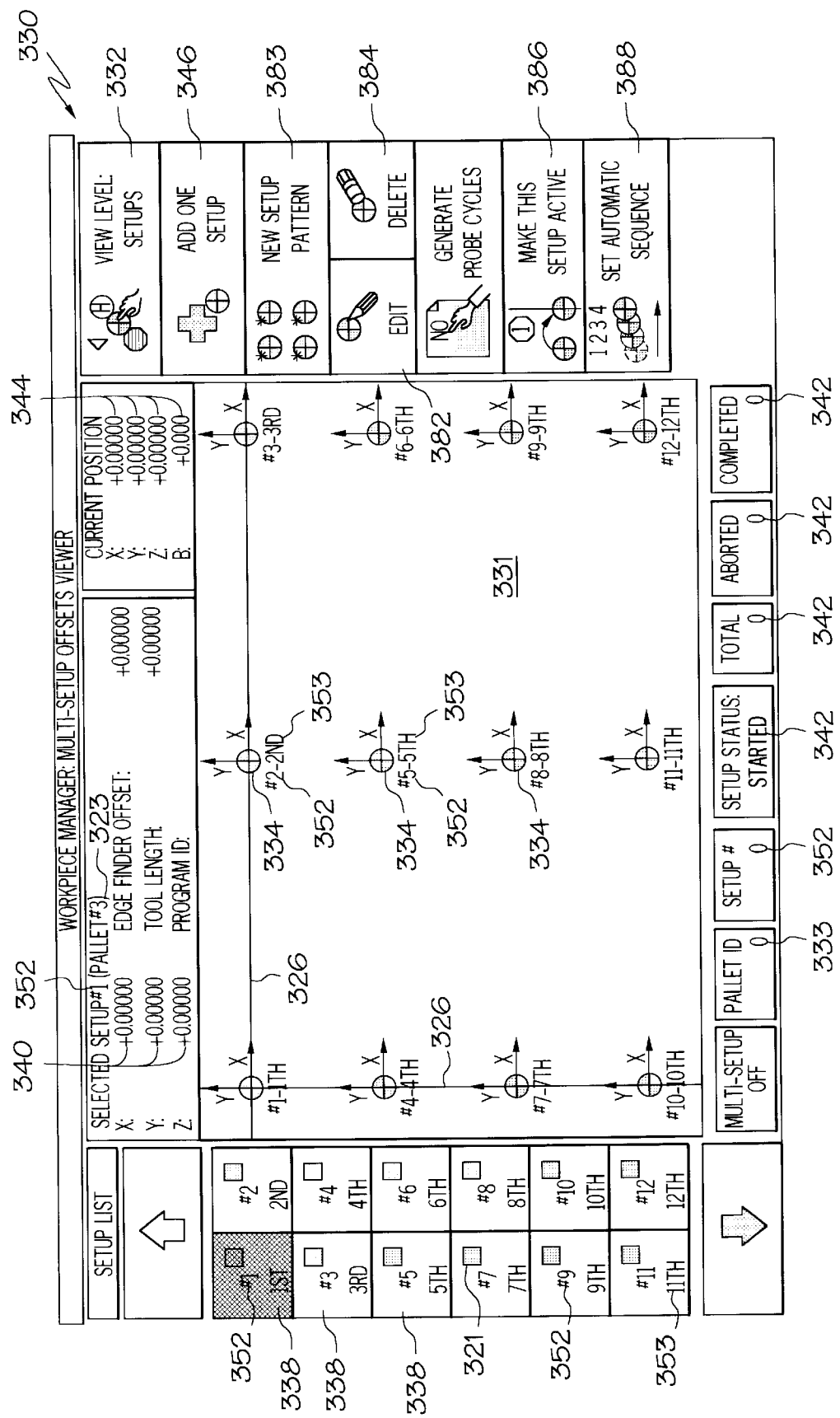
FIG. 5 is a schematic view of a preferred display for entering and viewing setup information, according to the present invention.

After the user has selected a pallet and switched to the setup view, a setup view display is displayed on the display device. Preferably, this setup view display is configured similar to the display of FIG. 5. As shown in FIG. 5, this display preferably comprises a window 330, a "view level" button 332, setup icons 334, setup information such as 352 and 353, and buttons 338. Upon switching from pallet view to setup view, the present invention displays setup icons 334 that represent the various setups located on the pallet that was selected in the pallet view. The invention displays setup information associated with each setup on the particular pallet, such as the setup identification number 352, and the order 353 in which the setup will be machined. This information is repeated on a series of buttons 338 along the left side of the display. Each button 338 also has a status indication symbol 321 displayed thereon, so that the machine system operator may quickly determine whether a problem was encountered with a particular setup.

As with the pallet view, in the setup view, the user is able to select one of the buttons 338 or one of the setup icons 334 in order to display additional setup information regarding that particular setup. This information can include setup offset coordinates 340 which indicate the position of the setup selected in relation to a fixed point in the machining system. Other information may also be displayed within the window, such as status information 342 which indicates the progress of the machining operations, and tool location 344 which indicates the position of the tool relative to the fixed location within the system. It is preferred that the tool location 344 is obtained through a machine control system and/or other workstation application programs. In addition, it should be understood that the status information 342 and the tool location 344 can be displayed in other views, such as the pallet view of FIG. 2.

When the user switches from pallet view to setup view, if no information regarding the setups on the pallet selected has yet been entered by the user, no setup icons 334 or setup information will be displayed within the window 330. To indicate which setups are located on the pallet and where the setups are located on the pallet, the user may select the "add one setup" button 346.

Figure 6:
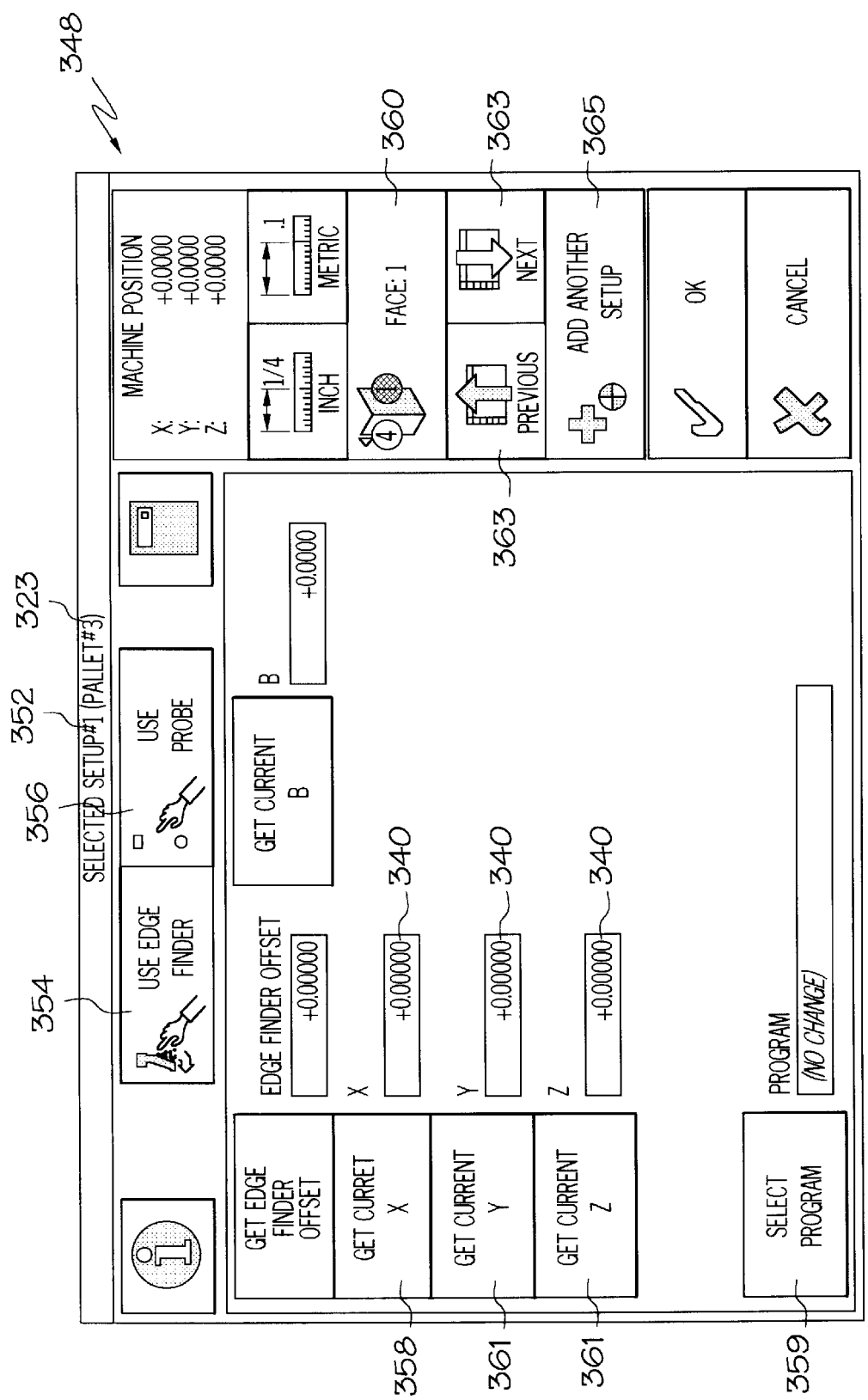
FIG. 6 is a schematic view of a display for the entry of information associated with setups in a machining system, according to an embodiment of the invention.

When the "add one setup" button 346 is selected, the user is able to indicate which setups are located on the pallet and where the setups are located, preferably through the use of an "add setup" dialog box 348, such as is shown in FIG. 6. The "add setup" dialog box 348 allows the user to enter setup information, or data, regarding the setups on a particular pallet, such as the offset coordinates 340 associated with that particular setup. Preferably, the program automatically assigns a setup identification number 352 for each setup being defined, although it should be understood that this number may be entered manually by the user without departing from the scope of the invention. The dialog box 348 also displays a "select program" button 359 which, when selected by the user, displays a list of part programs, one of which can be chosen for the particular setup. The part program contains the instructions that will be executed by the machine in machining the setup part (e.g., milling at certain locations on the part). Once a setup has been defined (e.g., has been assigned an identification number, offset coordinates, and part program), the program associates the setup information with the pallet information corresponding to the pallet upon which the setup is located, thereby allowing the display of the appropriate setup icons and setup information when the user switches from pallet view to setup view. This association can be achieved, for example, by saving the setup information in a separate file with its corresponding pallet information. More preferably, the association is achieved by indexing the setup data for each setup with a pallet number which identifies the pallet on which the setup is located.

The dialog box 348 of FIG. 6 also allows information for previously defined setups to be viewed and edited through use of the "previous" and "next" buttons 363. Also, an additional setup may be defined by pressing the "add another setup" button 365.

Referring again to FIG. 5, it is preferred that the setup icons 334 are displayed at a location within the window 330 according to the setup offset coordinates 340 entered for each setup. Thus, the setup icons 334 are displayed within window 330 in a manner which mimics the actual physical arrangement of the setups on the particular pallet. Preferably, this is achieved by scaling the offset coordinates 340 of the setup to the size of the display portion 331 of the window 330. In another preferred embodiment, the display portion 331 represents a scaled version of the movement limits of the machining tool, and the setups are displayed in relation to these limits. Thus, the program associates the setup offset coordinates with an icon position for the setup icon by scaling.

Referring again to FIG. 6, it should be noted that while "rough" estimates for the setup offset coordinates 340 may be entered manually by the user when the setup is located outside of the machining area, it is preferred that, once the setup is within the machining area, the "edge finder" button 354 or "probe" button 356 are utilized to automatically obtain the precise setup offset coordinates for the selected setup. If the edge finder function is used, the current machine tool located in the spindle is moved into contact with the setup part to be machined in order to determine the part's location with respect to a fixed machining system location. For example, the machine tool can be moved by the user to the "x" side of the part, and then the "get current x" button 358 can be pressed by the user to get the current "x" location of the machine and use this value to determine the precise "x" setup offset coordinate. This process may be repeated in the "y" and "z" axes as well through use of buttons 361. If the probing function is utilized, a probe located within the spindle probes the part to determine its setup offset coordinates 340.

Figures 7, 8:
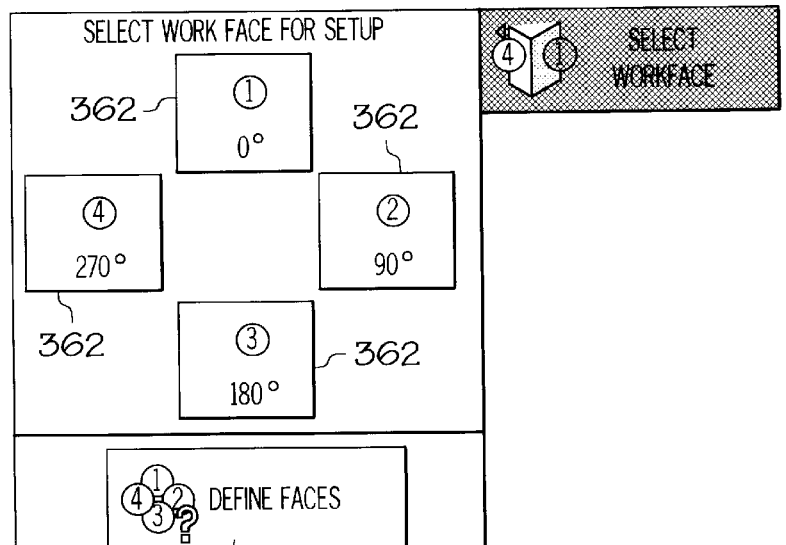
FIG. 7 is a schematic view of a display for selecting the workface upon which a setup is located, according to a preferred embodiment of this invention.
FIG. 8 is a schematic view of a preferred display for defining workfaces in a machining system, according to the present invention.

As noted above, a setup may be located on a tombstone which is secured to a pallet, or on a rotary table. Both tombstones and rotary tables have a number of faces to which setups may be secured. When the user is defining which setups are on a particular pallet by using dialog box 348, the user can also specify whether the setup is located on the face of a rotary table or tombstone. The user may choose the face upon which the setup being defined is located by selecting face button 360 of FIG. 6. This button preferably produces a display such as that of FIG. 7, which allows the user to select the workface upon which the setup is located (if the workfaces have already been defined) or to define how the workfaces are arranged (if the faces have not yet been defined). Referring now to FIG. 7, the user may select the predefined face by choosing one of the face selection buttons 362, the number and arrangement of which will vary depending upon how the user has defined the faces. If the faces need to be defined or to be redefined, the user may select the "define faces" button 364.

The "define faces" button 364 allows the user to define the number of faces on the rotary table or tombstone and the angle at which the faces are arranged, preferably through the use of a "define faces" dialog box 366, as shown in FIG. 8. The "define faces" dialog box 366 allows the user to enter the number of faces 368 and the angles 370 at which each face is located. Moreover, the user can select a "face numbering" button 372 to define the order in which the faces will be numbered, clockwise or counter-clockwise. Also, if the user deletes a face in the "define faces" dialog box 366, any setups previously defined as being located on that face are removed.

Figure 9:
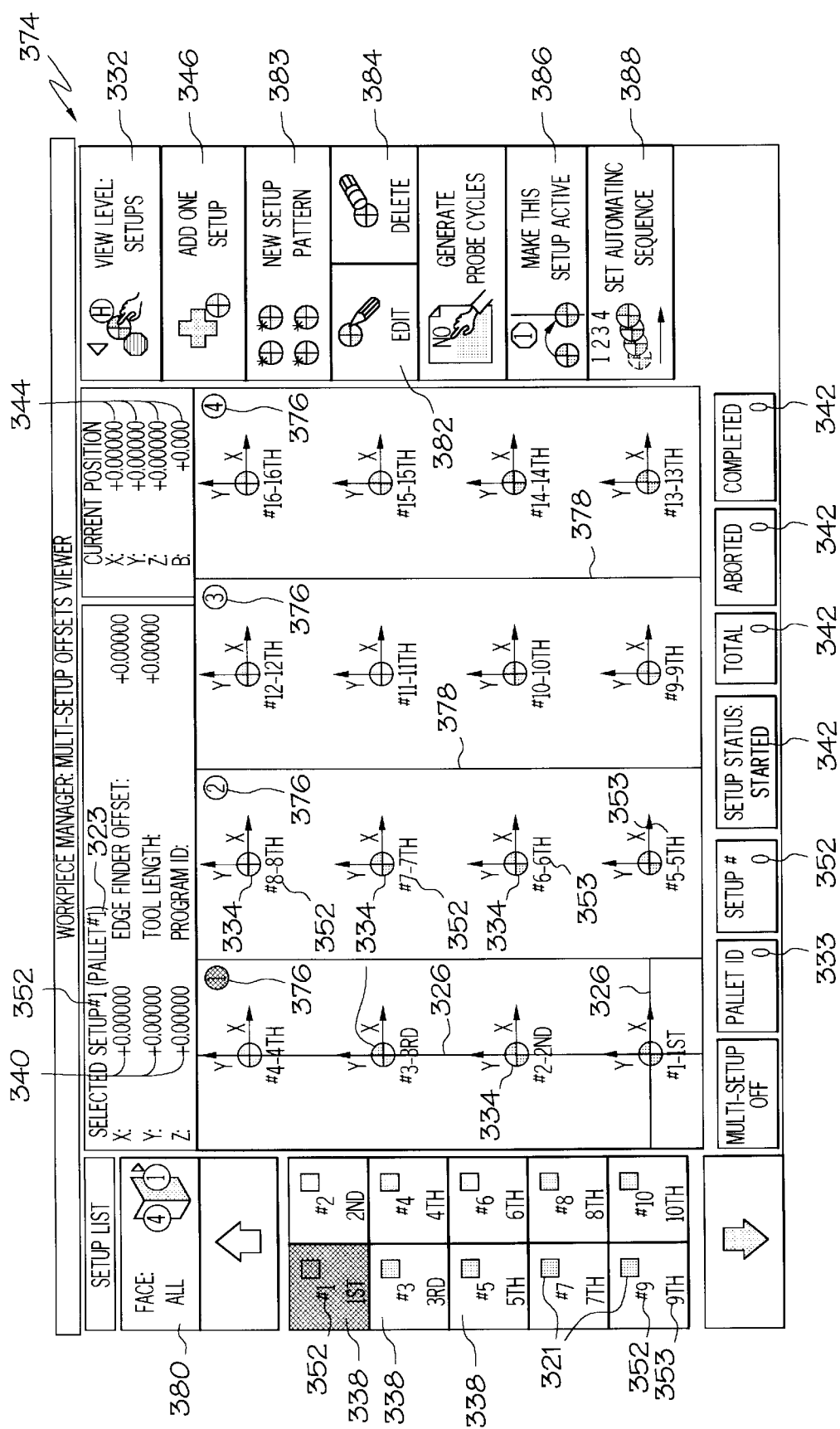
FIG. 9 is a schematic view of a display, according to an embodiment of the invention, for displaying information associated with setups and workfaces in a machining system.

Upon exiting from the face definition dialog box 366 (such as by clicking the OK button), the setup view is updated to show the faces, preferably in a column format such as is shown in the setup view window 374 of FIG. 9. The window 374 is similar to the setup view window 330 of FIG. 5. However, the face number icons 376 for the particular pallet are also displayed and vertical lines 378 are used to separate the faces. For example, the setup icons and setup information for the setups located on workface number one are displayed in the column having the number "1" face icon 376 at the top. The user may indicate which faces he or she wishes to view by using "face display" button 380. The button 380 allows the user to switch between viewing the setups for all of the faces at once, or to display the setups for only a single face.

As with the pallet views, when the user is in a setup view, such as shown in FIG. 5 and FIG. 9, the user may select a setup button 338 or setup icon 334 to view the offset coordinates 340 for the selected setup. Moreover, once a setup is selected, cross hairs 326 appear over the selected setup. Once a setup is selected, the user may select the "edit setup" button 382 or "delete setup" button 384 to change the information associated with the setup or delete the setup information and icon completely, as is needed. The user may also use the "activate setup" button 386 to indicate that the selected setup is ready to be machined, or the "automatic sequence" button 388 to automatically define the order in which the setups will be machined. Moreover, as an alternative to defining each setup one at a time using the "add setup" button 346, the user may utilize "setup pattern" button 383 to automatically define the arrangement of the setups and setup information according to a number of available arrangements. The user can edit this information if needed, such as when the pattern selected does not directly coincide with the actual configuration of the setups.

Figure 10:
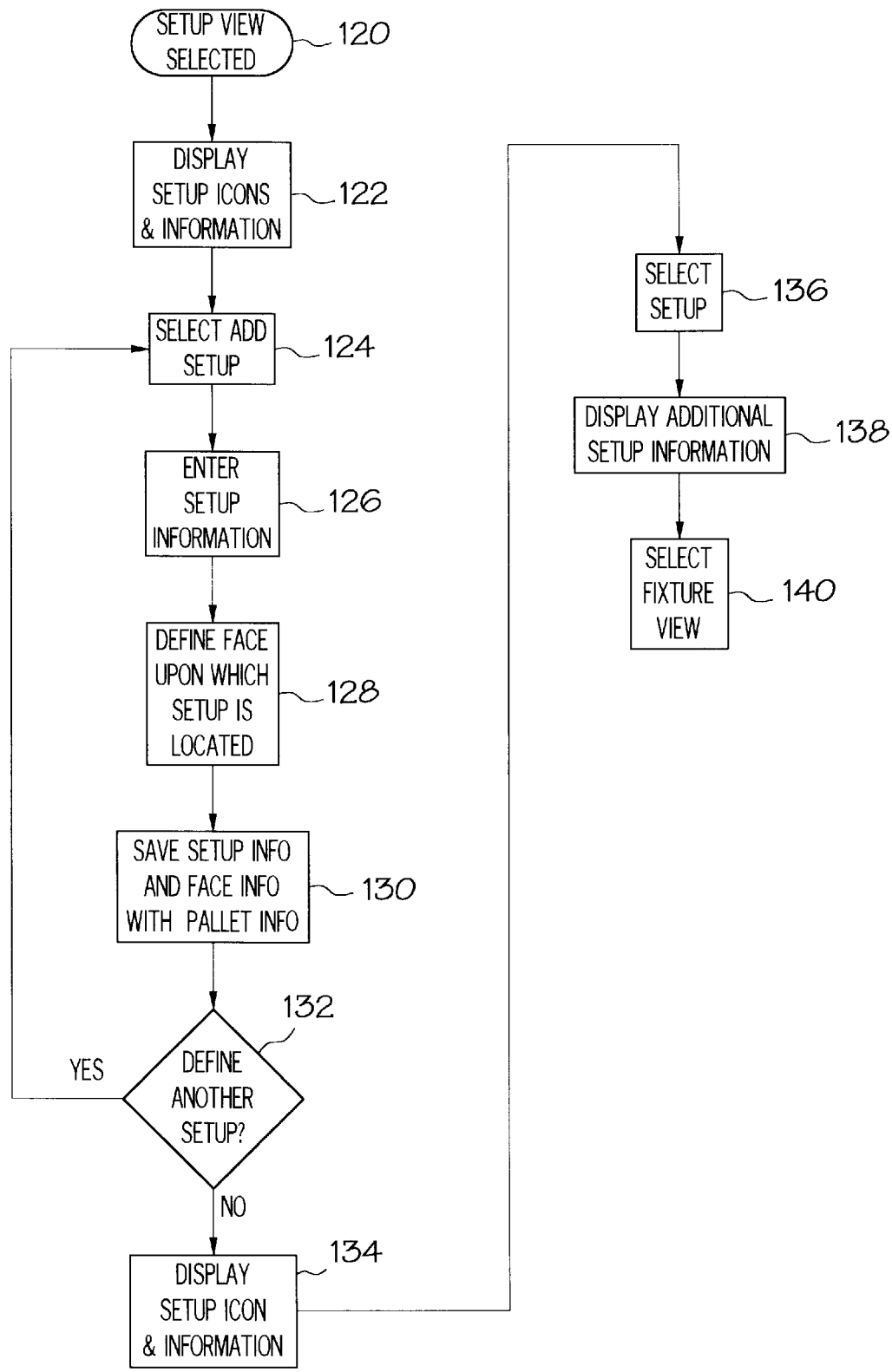
FIG. 10 is a flow diagram illustrating a preferred method for viewing and entering information associated with setups in a machining system.

FIG. 10 is a flow diagram illustrating a preferred method for entering and displaying setup and workface information and icons. At step 120, the setup view is selected after a pallet is chosen in the pallet view, such as the view of FIG. 3 (if a single pallet system is being utilized, the setup view will automatically be displayed, and the setup view will not need to be selected). When the setup view is selected, any setup information already entered for the selected pallet is displayed at step 122. For each setup defined, a setup icon is also displayed at step 122. If setups are to be defined, the user can then select the "add setup" button at step 124. At step 126, the setup information for the setup being defined is entered. After the setup information is entered, the face upon which the setup is located can be defined, at step 128. (If the number of faces has not yet been defined, the user will need to define the faces, such as by using the dialog box 366 of FIG. 8.)

Upon defining the setup information and face number, the user may indicate that the information is to be saved, such as by selecting an OK button or enter key, at which time step 130 is executed and the setup information and face information is saved in a manner that associates the information with the appropriate pallet information, such that when the user selects a particular pallet and switches to setup view, the information regarding the setup on the pallet will be displayed.

At step 132, the user can choose to define another setup that is located on the selected pallet. If additional setups are to be defined, steps 124–130 are repeated. If no additional setups are to be defined, setup icons and setup information are displayed at step 134 for the setups which have been defined. When the setup icons and information are displayed, the user may select a setup at step 136, preferably by selecting a setup icon or a setup button. The selection of a setup causes additional setup information, such as setup offset coordinates, to be displayed on the display device at step 138. To view information associated with the various fixtures that may make up the selected setup, the user may select the fixture view at step 140.

Referring again to FIG. 5, the user may select the fixture view by selecting the "view level" button 332. The selection of the "view level" button 332 preferably causes a drop down menu to appear which allows the user to select the fixture view. Upon selection of the fixture view, the user is able to view information regarding the fixtures associated with the setup, preferably by use of fixture view window 400 of FIG. 11. Fixture view window 400 displays fixture icons 402 in an arrangement that corresponds with the fixture offsets 408 entered by the user. The window also displays other fixture information, such as fixture number 404, near each fixture icon 402. Window 400 also includes fixture buttons 406, which allow the user to select a particular fixture on the screen, similar to the setup buttons 338 in the setup view and pallet buttons 324 in the pallet view.

Figure 11:
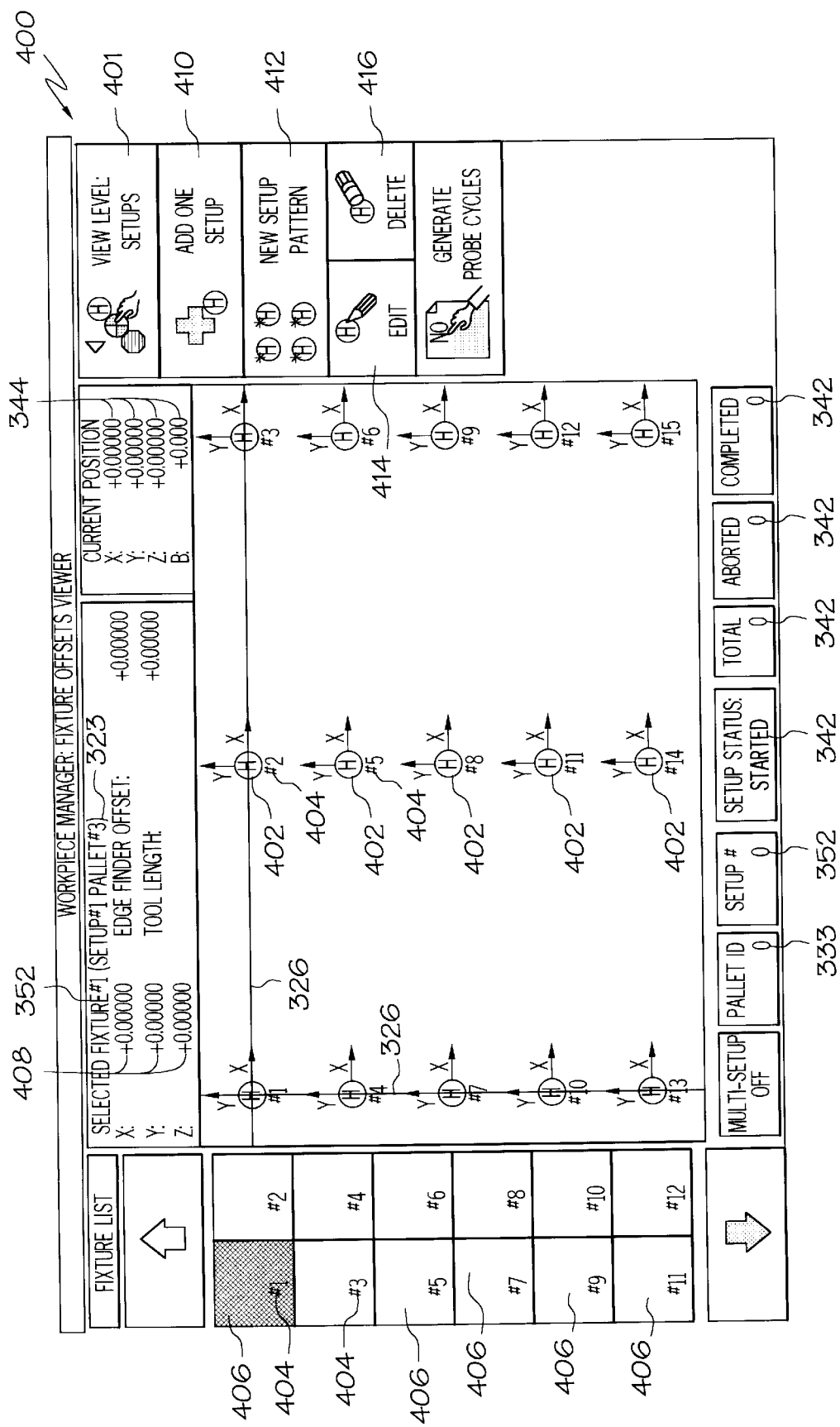
FIG. 11 is a schematic view of a preferred display for viewing and entering information associated with fixtures in a machining system, in accordance with this invention.

As also shown in FIG. 11, the tool location 344, status information 342, pallet information such as pallet number 323, and setup information such as setup number 352, can also be displayed. The user can select a particular fixture by using the buttons 406 or icons 402 to display the offsets 408 for the selected fixture.

If the fixtures have not yet been defined for the particular setup selected, the user may supply the necessary information or data through the use of either the "add one fixture" button 410 or the "new fixture pattern" button 412. If the "add one fixture" button 410 is selected, a dialog box is preferably displayed that allows the user to enter information regarding the fixtures associated with the selected setup. This fixture information can include fixture number 404 and fixture offset coordinates 408. Preferably, this dialog box is similar to the dialog box 348 of FIG. 6. Alternatively, the user can choose "new fixture pattern" button 412, which automatically enters fixture information according to the pattern defined by the user. The user can then edit this information if needed, e.g., when the pattern selected does not directly coincide with the actual configuration of the fixtures in the setup.

Once fixture information is entered and displayed in the window 400, the information for any given fixture can be edited by selecting "edit" button 414 or deleted by selecting "delete" button 416. The user can select the desired fixture to be edited or deleted by choosing the appropriate button 406 or appropriate icon 402, and then choosing either the "edit" button 414 or "delete" button 416. If "edit" button 414 is selected, it is preferred that a dialog box be opened which allows the user to edit the information regarding the selected fixture. When a fixture is selected, it is preferred that cross hairs 326 are displayed over the fixture icon representing the fixture selected.

Figure 12:
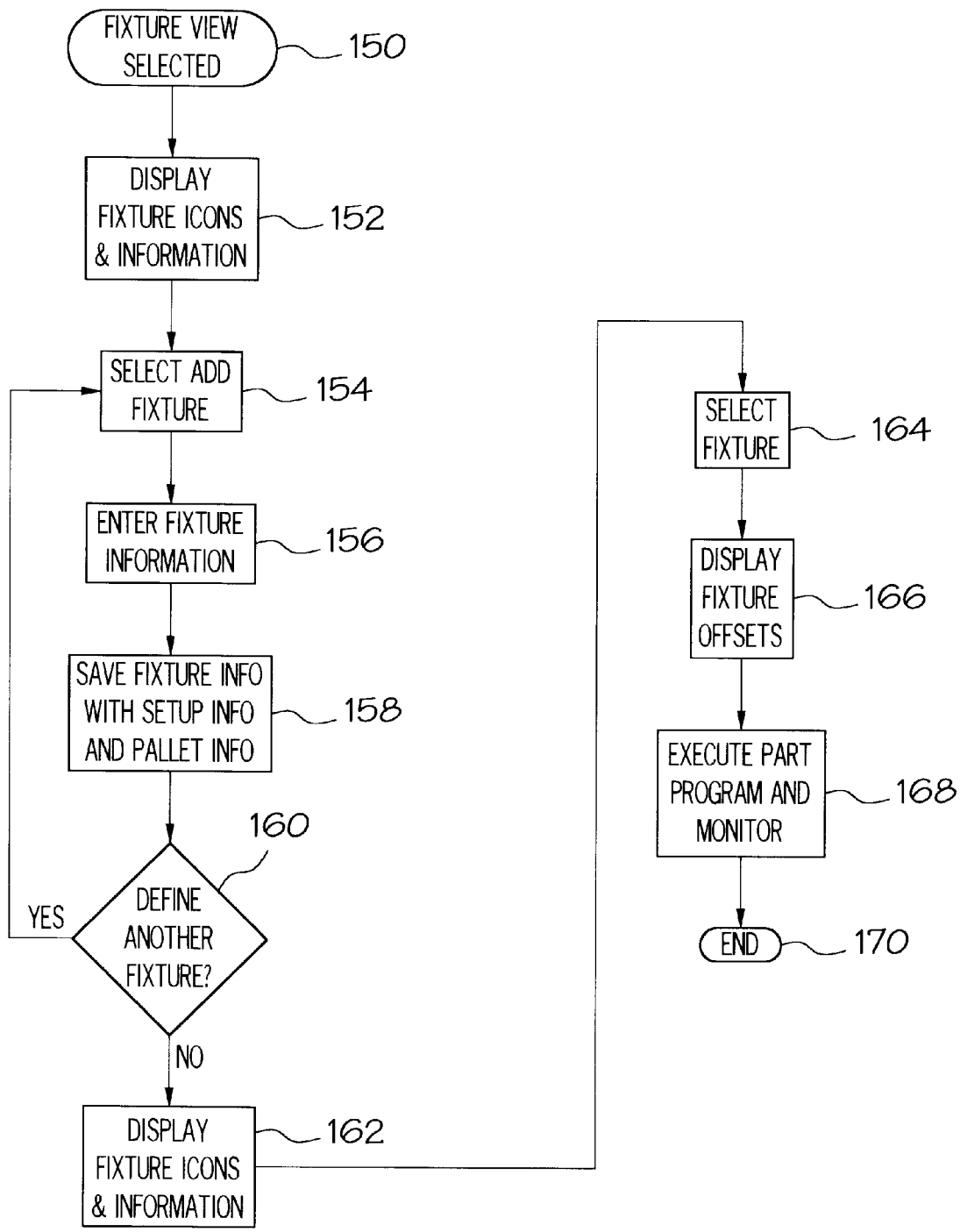
FIG. 12 is a flow diagram illustrating a preferred method for viewing and entering information associated with fixtures in a machining system, according to the present invention.

FIG. 12 is a flow diagram illustrating a method for entering and displaying fixture information in accordance with the present invention. At step 150, the fixture view is selected after the user has selected a setup for which the fixtures are to be viewed. Upon selection of the fixture view, fixture icons and information are displayed on the display device, at step 152. If additional fixtures are associated with the setup, and icons and information for these additional fixtures are not already shown, the user selects the add fixture option, at step 154, which allows the user to enter information regarding fixtures associated with the selected setup. This fixture information is entered at step 156. When the fixture information has been entered, step 158 may be executed, such as by selecting an OK button, whereby the fixture information is saved in a manner that associates the information with its corresponding setup and pallet information, such as by providing two index numbers for the fixture, one number corresponding to the setup of which the fixture is a part, and the other number corresponding to the pallet on which the fixture is located.

Continuing to step 160, if additional fixtures are to be added, the user may repeat steps 154, 156, and 158. If additional fixtures are not to be added, step 162 is executed whereby fixture icons and fixture information are displayed for the selected setup. The user then selects a fixture at step 164. When a fixture is selected, offset coordinates for the selected fixture are displayed at step 166. The user may then execute the part program (which initiates the machine) and monitor the machining operations as shown in step 168 until the machining operations end at step 170. It is to be understood that, before machining operations are initiated and/or while machining operations are being performed, the user may switch to any view, such as to a pallet view, a setup view, or a fixture view, to view and/or edit information associated with pallets, setups and fixtures. For example, if the user is viewing the fixture view of FIG. 11, button 401 can be utilized to switch to pallet or setup view.

Accordingly, the present invention provides a graphical assistance for entering and displaying information regarding setups in a machining system, as well as the other structures associated with setups, such as pallets, fixtures, and workfaces. The invention allows the operator of the machining system to easily monitor the various setups and structures that are located in the machining area and are ready to be machined, as well as those located outside the machining area and are waiting to be machined.

The invention also provides status information regarding the location of the machine tool and the status of various parts (e.g., whether they have been machined, or are waiting to be machined.) Moreover, the user can quickly and efficiently enter information regarding the pallets and setups in the machining area or at a pallet park station, and is provided with an easy to understand graphical display of the organization of the pallets and setups. Moreover, the present invention allows the user to leave the machining system unattended while various setups and/or pallets are machined, and upon return to the machining system, to quickly determine if each part was machined successfully.

While preferred exemplary embodiments of the present invention have been described, it is to be understood that further adaptions of the invention described herein can be accomplished by appropriate modifications by one of ordinary skill in the art without departing from the scope of the present invention. Accordingly, although preferred configurations of the various windows, dialog boxes, menus, icons, and buttons have been described, it is to be understood that these elements may take on a wide variety of configurations and arrangements without departing from the scope of the present invention. Moreover, while it is preferred that the invention take the form of a software program written in Visual Basic programming language, it should also be understood that the invention may take other forms and utilize other programming languages as well. Therefore, the scope of the present invention should be considered in terms of the following claims and should not be limited to the details of the structures and methods shown and described in the specification and drawings.

What is claimed is:

1. A computer-implemented method for entering and displaying information associated with a pallet in a machining system, comprising the steps of:

receiving pallet data associated with a pallet, the pallet comprising a movable tray to which a plurality of workpieces in a machining system can be secured, the machining system being operative for machining the workpieces;

displaying a machine configuration image on a display device, the machine configuration image representing the physical configuration of the machining system;

displaying at least a portion of the pallet data on the display device;

associating at least a portion of the pallet data with an icon location, the icon location corresponding to a position on the display device; and displaying a pallet icon at the icon location such that the display of the pallet icon with respect to the machine configuration image substantially coincides with the physical location of the pallet with respect to the physical configuration of the machining system.

2. The method as recited in claim 1, further comprising:

obtaining tool location information, the tool location information corresponding to a location of a tool with respect to a predetermined location in the machining system; and displaying the tool location information on the display device.

3. The method as recited in claim 1, wherein the pallet data comprises:

pallet offset coordinates, the pallet offset coordinates corresponding to the location of the pallet in relation to a predetermined position in the machining system.

4. The method as recited in claim 3, further comprising:

selecting a location on the display device with a selection device, the selected location defining the icon location.

5. The method as recited in claim 1, further comprising:

selecting the pallet icon; and upon selection of the pallet icon, displaying additional pallet data on the display device.

6. The method as recited in claim 1, wherein the step of receiving pallet data comprises:

requesting a user to enter pallet data; and storing the pallet data entered by the user.

7. The method as recited in claim 1, further comprising:

receiving setup information associated with at least one setup in the machining system;

selecting the pallet icon with a selection device; and after selecting the pallet icon, displaying at least a portion of the setup information on the display device.

8. The method as recited in claim 7, further comprising:

after selecting the pallet icon, displaying a setup icon on the display device, the setup icon representing a setup.

9. The method as recited in claim 8, wherein the setup information comprises setup offset coordinates, and wherein the setup icon is displayed at a location corresponding to the setup offset coordinates.

10. A system for entering and displaying information associated with a pallet in a machining system, the system comprising:

a database containing pallet data, the pallet data comprising pallet offset coordinates which indicate a location of a pallet in a machining system relative to a predetermined location, the pallet data being associated with a pallet, the pallet comprising a movable tray to which a plurality of workpieces in a machining system can be secured, the machining system being operative for machining the workpieces; and a display including the pallet offset coordinates, a plurality of pallet icons representing a plurality of pallets in the machining system, and a machine configuration image representing the physical configuration of the machining system, the display being adapted to receive inputs for modifying the database.

11. The system as recited in claim 10, wherein the display further comprises:

tool location information corresponding to a location of a tool with respect to a predetermined location in the machining system; and a status indicator representing the machining status of a pallet.

12. The system as recited in claim 10, wherein the database further includes setup information associated with the pallet data, the setup information corresponding to at least one setup in the machining system.

13. A computer readable medium having encoded thereon a computer-implemented method for entering and displaying information associated with a fixture in a machining system, the method comprising:

receiving fixture offset coordinates which indicate a location of a fixture in a machining system relative to a predetermined location, the fixture being adapted to secure a workpiece to a surface in a machining system, the machining system being operative for machining the workpiece;

displaying the fixture offset coordinates on a display device; and displaying a plurality of fixture icons on the display device, each fixture icon representing a fixture in the machining system.

14. The computer readable medium as recited in claim 13, wherein the method further comprises:

obtaining tool location information, the tool location information corresponding to a location of a tool with respect to a predetermined location in the machining system; and displaying the tool location information on the display device.

15. The computer readable medium as recited in claim 13, wherein the method further comprises:

receiving a fixture identification number; and displaying the fixture identification number in proximity to a corresponding fixture icon.

16. A user interface for entering and displaying information associated with a workface in a machining system, comprising:

a plurality of workface icons, each workface icon representing a work face, the workface comprising a surface of a multi-sided structure to which a plurality of workpieces in a machining system can be secured, the machining system being operative for machining the workpieces;

workface identification data identifying a surface of the multi-sided structure; and setup information identifying at least one setup on a surface of the multi-sided structure;

wherein the interface is adapted to receive inputs for at least one of editing, adding, and deleting the setup information.

17. The user interface as recited in claim 16, further comprising:

a machine configuration image, the image representing a configuration of the machining system.

18. The user interface as recited in claim 16, further comprising:

a status indicator representing the machining status of a workface.

19. A computer-implemented method, comprising:

displaying a plurality of pallet icons, each pallet icon representing a pallet in a machining system, each pallet comprising a movable tray to which a plurality of workpieces can be secured;

receiving a plurality of pallet data records, each pallet data record being associated with a pallet in the machining system, each pallet data record including pallet offset coordinates which indicate a location of a pallet relative to a predetermined location in the machining system;

displaying at least a portion of each pallet data record in proximity to each displayed pallet icon;

selecting a pallet icon with a selection device; and after selecting the pallet icon, displaying data associated with various workpieces that are secured to the pallet which is represented by the selected pallet icon.

20. The method as recited in claim 19, further comprising:

after selecting the pallet icon, displaying a plurality of setup icons.

21. The method as recited in claim 20, further comprising:

selecting one of the setup icons with a selection device; and after selecting the setup icon, displaying fixture data associated with the selected setup icon.

22. A computer-implemented method for entering and displaying information associated with a workface in a machining system, comprising the steps of:

receiving workface data associated with a workface in a machining system, the workface comprising a surface of a multi-sided structure to which a plurality of workpieces can be secured, the machining system being operative for machining the workpieces;

displaying at least a portion of the workface data on a display device;

associating at least a portion of the workface data with an icon location, the icon location corresponding to a position on the display device; and displaying a workface icon at the icon location, the workface icon representing the workface.

23. The method as recited in claim 22, further comprising:

displaying setup icons and setup information associated with the workpieces secured to the workface.

24. The method as recited in claim 22, wherein the multi-sided structure comprises a tombstone.

25. A user interface for entering and displaying information associated with a pallet in a machining system, comprising:

a plurality of pallet icons, each pallet icon representing a pallet in a machining system, each pallet comprising a movable tray to which a plurality of workpieces can be secured;

pallet identification data identifying each pallet; and pallet offset coordinates which indicate a location of a pallet in the machining system relative to a predetermined location;

wherein the interface is adapted to receive inputs for editing the pallet offset coordinates.

26. The user interface as recited in claim 25, further comprising:

a machine configuration image, the image representing a configuration of the machining system.

27. The user interface as recited in claim 26, wherein the machine configuration image is created by the step of:

drawing the machine configuration image using a computer program.

28. The user interface as recited in claim 26, wherein the machine configuration image is created by the steps of:

drawing a plurality of machine configuration images, each machine configuration image representing a configuration of a machining system; and selecting the machine configuration image from the plurality of machine configuration images.

* * * * *